US005901329A

United States Patent [19]

Kito

[11] Patent Number: 5,901,329

[45] **Date of Patent: * May 4, 1999**

[54] DATA PROCESSING TERMINAL WHICH DETERMINES A TYPE OF AN EXTERNAL DEVICE

[75] Inventor: Masaru Kito, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/385,169

[22] Filed: Feb. 7, 1995

[30] Foreign Application Priority Data

Mar. 18, 1994 [JP] Japan .................................... 6-049598

[51] Int. Cl.[6] ....................................................... G06F 13/00

[52] U.S. Cl. ............................................ 395/828; 395/882

[58] Field of Search .................................... 395/836, 837, 395/882, 281, 750, 500, 828

[56] References Cited

U.S. PATENT DOCUMENTS

| | | | |
|---|---|---|---|
| 4,360,870 | 11/1982 | McVey | 395/828 |
| 4,794,525 | 12/1988 | Pickert et al. | 395/750 |
| 4,827,432 | 5/1989 | Kasano | 364/518 |
| 4,890,234 | 12/1989 | Tanaka et al. | 364/474.23 |
| 4,899,306 | 2/1990 | Greer | 395/500 |
| 4,908,038 | 3/1990 | Matsumura et al. | 902/5 |
| 4,952,785 | 8/1990 | Kikuda | 235/432 |
| 4,964,124 | 10/1990 | Burnett | 371/15.1 |
| 4,972,470 | 11/1990 | Farago | 380/3 |
| 5,058,055 | 10/1991 | Takemoto et al. | 364/519 |
| 5,078,518 | 1/1992 | Ono et al. | 400/103 |
| 5,113,497 | 5/1992 | Dewa | 395/836 |
| 5,167,021 | 11/1992 | Needham | 395/836 |
| 5,179,703 | 1/1993 | Evans | 395/700 |
| 5,202,899 | 4/1993 | Walsh | 375/8 |
| 5,274,781 | 12/1993 | Gibart | 395/836 |
| 5,313,642 | 5/1994 | Seigel | 395/75 |
| 5,317,695 | 5/1994 | Celi, Jr. | 395/836 |
| 5,321,619 | 6/1994 | Matsuda et al. | 364/468 |
| 5,390,314 | 2/1995 | Swanson | 395/500 |
| 5,481,696 | 1/1996 | Lomp et al. | 395/500 |
| 5,594,230 | 1/1997 | Waite et al. | 235/462 |

FOREIGN PATENT DOCUMENTS

| | | |
|---|---|---|
| 62-67628 | 3/1987 | Japan . |
| 5-53965 | 3/1993 | Japan . |

*Primary Examiner*—Ayaz R. Sheikh
*Assistant Examiner*—David A. Wiley
*Attorney, Agent, or Firm*—Armstrong, Westerman, Hattori, McLeland & Naughton

[57] ABSTRACT

A data processing terminal sends control commands to an external device to control the external device. The data processing terminal has a control command sending unit and an external device determining unit. The control command sending unit is used to send a control command to the external device. The external device determining unit is used to determine a type of the external device according to a response returned by the external device in response to the control command. Therefore, the data processing terminal is capable of determining the type of an external device such as a bar code reader connected thereto and of converting a control command in a predetermined format into one in another format, so that the data processing terminal can employ a single program to control bar code readers which use different command systems.

9 Claims, 15 Drawing Sheets

Fig.8

COMMANDS FOR PEN SCANNER

| COMMAND FORMAT | DEFINITION | RESPONSE |
|---|---|---|
| CR [$(0D)_{16}$] | UNDEFINED | TURN OFF SIGNAL CS |
| , [$(2C)_{16}$] | READ 28 DIGITS | TURN OFF SIGNAL CS |
| A [$(41)_{16}$] | ENABLE READING CODE 39 | TURN OFF SIGNAL CS |
| C [$(43)_{16}$] | ENABLE READING JAN/EAN/UPC | TURN OFF SIGNAL CS |
| L [$(4C)_{16}$] | LIGHT RED LAMP | TURN OFF SIGNAL CS |
| O [$(4F)_{16}$] | SET DEFAULT STATE | TURN OFF SIGNAL CS |
| S [$(53)_{16}$] | TEST CHECK DIGIT | TURN OFF SIGNAL CS |
| a [$(61)_{16}$] | DISABLE READING CODE 39 | TURN OFF SIGNAL CS |
| b [$(62)_{16}$] | DISABLE READING NW7 | TURN OFF SIGNAL CS |
| d [$(64)_{16}$] | DISABLE READING STF | TURN OFF SIGNAL CS |
| e [$(65)_{16}$] | DISABLE READING ITF | TURN OFF SIGNAL CS |
| f [$(66)_{16}$] | DISABLE READING CODE 11 | TURN OFF SIGNAL CS |
| g [$(67)_{16}$] | DISABLE READING CODE 93 | TURN OFF SIGNAL CS |
| w [$(76)_{16}$] | DISABLE READING CODE 128 | TURN OFF SIGNAL CS |

(HEXADECIMAL NOTATION)

Fig.9

COMMANDS FOR TOUCH SCANNER

| COMMAND FORMAT | DEFINITION | RESPONSE |
|---|---|---|
| L [$(4C)_{16}$]<br>+N [$(4E)_{16}$]+CR [$(0D)_{16}$] | LIGHT GREEN LAMP | RETURN ACK [$(06)_{16}$] |
| O [$(4F)_{16}$]+CR [$(0D)_{16}$] | UNDEFINED | RETURN NAK [$(15)_{16}$] |
| S [$(53)_{16}$]+CR [$(0D)_{16}$] | SET DEFAULT STATE | RETURN ACK [$(06)_{16}$] |
| S [$(53)_{16}$]+, [$(2C)_{16}$]<br>+A [$(41)_{16}$]+CR [$(0D)_{16}$] | READ JAN/EAN/UPC ONLY | RETURN ACK [$(06)_{16}$] |
| CR [$(0D)_{16}$] | UNDEFINED | RETURN NAK [$(15)_{16}$] |
| L [$(4C)_{16}$]<br>+O [$(4F)_{16}$]+CR [$(0D)_{16}$] | LIGHT RED LAMP | RETURN ACK [$(06)_{16}$] |

Fig. 10A-1
Fig. 10A-2
Fig. 10A-3
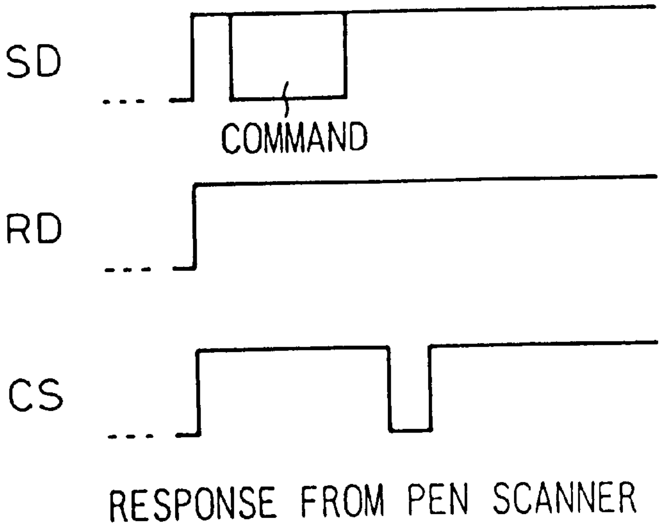
Fig. 10B-1
Fig. 10B-2
Fig. 10B-3
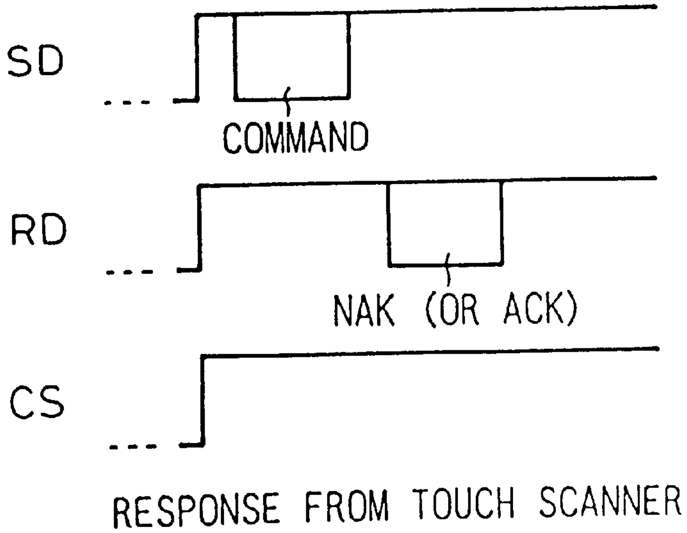

Fig.13

EXAMPLES OF COMMAND CONVERSIONS

| TOUCH SCANNER | PEN SCANNER | DEFINITION |
|---|---|---|
| S+CR | O | SET DEFAULT STATE |
| S, A CR | C a b d e f g w | READ JAN/EAN/UPC ONLY |
| L+N+CR | (NO CORRESPONDING COMMAND) | LIGHT GREEN LAMP |
| L+O+CR | L | LIGHT RED LAMP |

Fig.14

COMMANDS FOR LASER SCANNER

| COMMAND FORMAT | DEFINITION | RESPONSE |
|---|---|---|
| L [(4C)$_{16}$]<br>+N [(4E)$_{16}$]+CR [(0D)$_{16}$] | LIGHT GREEN LAMP | RETURN ACK [(06)$_{16}$] |
| O [(4F)$_{16}$]+CR [(0D)$_{16}$] | UNDEFINED | RETURN NAK [(15)$_{16}$] |
| S [(53)$_{16}$]+CR [(0D)$_{16}$] | SET DEFAULT STATE | RETURN ACK [(06)$_{16}$] |
| S [(53)$_{16}$]+, [(2C)$_{16}$]<br>+A [(41)$_{16}$]+CR [(0D)$_{16}$] | READ JAN/EAN/UPC ONLY | RETURN ACK [(06)$_{16}$] |
| CR [(0D)$_{16}$] | WAKE-UP COMMAND | RETURN ACK [(06)$_{16}$] |
| L [(4C)$_{16}$]<br>+O [(4F)$_{16}$]+CR [(0D)$_{16}$] | LIGHT RED LAMP | RETURN ACK [(06)$_{16}$] |

READ ENABLE/ DISABLE
ENABLED
DISABLED

TRIGGER SWITCH
ON
OFF

POWER SOURCE
ON
OFF

BAR CODE READING
YES
NO

COMMAND RECEPTION
ENABLED
DISABLED

RD
H
L

SD
H
L
P1
P2
P3
P4
P5
t1
t2
ACK
DATA
W-UP
COMMAND

DATA PROCESSING TERMINAL WHICH DETERMINES A TYPE OF AN EXTERNAL DEVICE

BACKGROUND OF THE INVENTION

1. Field of the Invention

The present invention relates to a data processing terminal, and more particularly, to a hand-held data processing terminal to be connected to an optional external device.

2. Description of the Related Art

Recently, hand-held data processing terminals have been used to collect data at the point of generation of the data, to order commodities and to manage stocks. The terminals are used in various industries, such as the distribution, manufacturing, power, gas, and water industries, to enable operators to enter and process data at a point of generation of the data that may be outdoors or indoors.

The data collected by the terminals are transferred to a personal computer or a server, which analyzes and processes the data, to make decisions on business plans and customer service.

One of the data input techniques usually adopted by the terminals is to read bar codes. Compared with manually entering data through a keyboard, reading bar codes is simple and fast and involves less errors.

The bar codes are read by a pen scanner, a touch scanner, or a laser scanner connected to the terminal, and bar code data are transferred to the terminal.

By the way, control command systems for bar code readers, including pen scanners, touch scanners, and laser scanners, differ from one another depending on their types. If a control command system in a given hand-held data processing terminal is entirely different from that of the bar code reader connected to the terminal, the bar code reader may not work. Moreover, if the command system in the terminal is connected to the wrong bar code reader, it may damage the bar code reader.

This trouble will not happen if all bar code readers employ the same command system. This, however, is not practical because it costs a large amount of money to remodel bar code readers. It is more economical to use marketed bar code readers. The problems of the related art will be explained in detail later.

SUMMARY OF THE INVENTION

An object of the present invention is to provide a hand-held data processing terminal capable of determining the type of an external device such as a bar code reader connected thereto and converting a control command in a predetermined format into one in another format, to enable the terminal to employ a single program to control bar code readers of different command systems. Another object of the present invention is to provide a compact, low power consumption, convenient hand-held data processing terminal.

According to the present invention, there is provided a data processing terminal that sends control commands to an external device connected thereto, to control the external device, wherein the data processing terminal comprises a control command sending unit for sending a control command to the external device, and an external device determining unit for determining a type of the external device according to a response returned by the external device in response to the control command.

The data processing terminal may further comprise a determination result storing unit for storing a result of determination made by the external device determining unit. The determination result storing unit may be a volatile memory.

The data processing terminal may further comprise a control command converting unit for converting the control command in one format into one in a proper format for the external device according to a result of determination made by the external device determining unit and for sending the converted control command to the external device. The control command converting unit may carry out a command conversion for the control command according to a conversion table. The conversion table may be stored in a semiconductor memory.

The semiconductor memory may be a nonvolatile memory. The control command sent by the control command sending means may be a command not influencing to a reading operation of the bar code reader.

According to the present invention, there is also provided an external device connected to a data processing terminal and returning a response signal to the data processing terminal after receiving a control command from the data processing terminal, wherein the external device comprises a power source unit for supplying power to specific elements in the external device; a power supply control unit for stopping the power from the power source unit to the specific elements in the external device if another control command from the data processing terminal is not received within a predetermined time; and a timer unit, provided in the power supply control unit, for starting time-counting after receiving the control command from the data processing terminal, and the predetermined time being counted by the timer unit.

Further, according to the present invention, there is provided an external device connected to a data processing terminal and returning a response signal to the data processing terminal after receiving a control command from the data processing terminal, wherein the external device comprises a power source unit for supplying power to specific elements in the external device; a power supply control unit for stopping the power from the power source unit to the specific elements in the external device if another control command from the data processing terminal is not received within a predetermined time; and a timer unit, provided in the power supply control unit, for starting time-counting after returning the response signal to the data processing terminal, and the predetermined time being counted by the timer unit.

A state of stopping the supply of power to the specific elements may established a power saving state. The power supply control unit may comprise a trigger switch for activating a power source circuit and for supplying power to the specific elements in order to start reading a bar code, when the trigger switch is pushed during the power saving state.

The power supply control unit may comprise a polarity inversion detector for activating a power source circuit and for supplying power to the specific elements in order to start reading a bar code, when a proper command is sent from the data processing terminal during the power saving state. The polarity inversion detector may detect a polarity of the proper command and control to supply or stop the supply of power to the specific elements.

The external device may further comprise a controller for recognizing the control command and for carrying out an operation corresponding to the control command by using the specific elements.

The specific elements may include a light emitter for emitting a light to a bar code, a light receiving unit for receiving a reflected light from the bar code, and a decoder for decoding output signals of the light receiving unit in response to the reflected light.

The external device may be a bar code reader, and the data processing terminal may be a hand-held data processing terminal.

BRIEF DESCRIPTION OF THE DRAWINGS

The present invention will be more clearly understood from the description of the preferred embodiments as set forth below with reference to the accompanying drawings, wherein:

FIG. 8 is a table of commands for a pen scanner;

FIG. 9 is a table of commands for a touch scanner;

FIG. 10A is a waveform diagram showing a response from a pen scanner returned in response to one of the commands of FIG. 8;

FIG. 10B is a waveform diagram showing a response from a touch scanner returned in response to one of the commands of FIG. 9;

FIG. 13 is a table of command conversions for different external devices, according to the present invention;

FIG. 14 is a table of commands for a laser scanner;

DESCRIPTION OF THE PREFERRED EMBODIMENTS

For a better understanding of the preferred embodiments of the present invention, the problems in the prior art will be explained.

Figure 1:
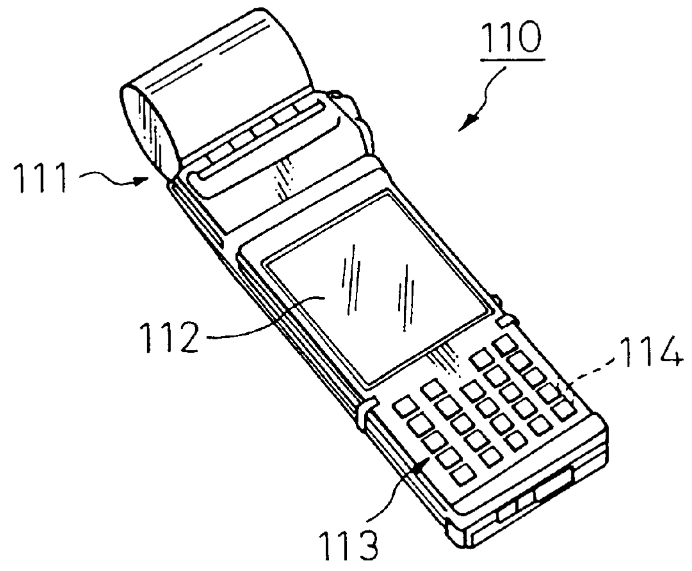
FIG. 1 is a perspective view showing a general-purpose hand-held data processing terminal.
Figure 2:
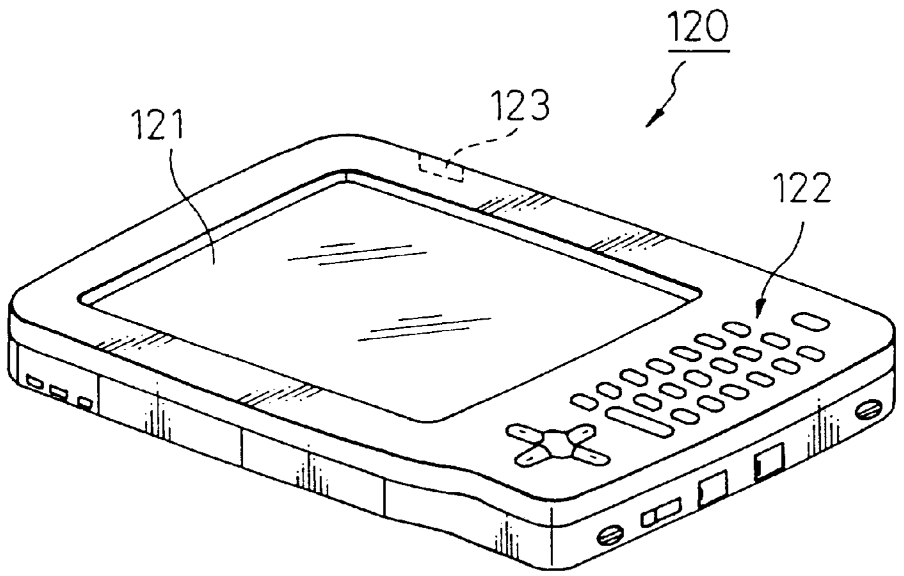
FIG. 2 is a perspective view showing an information-reference-type hand-held data processing terminal.

FIG. 1 shows a general-purpose hand-held data processing terminal, and FIG. 2 shows an information-reference-type hand-held data processing terminal.

In FIG. 1, the terminal 110 comprises a printer 111, a display 112, operation keys 113, and a connector 114 to be connected to an external device such as a pen scanner or a bar code reader. The terminal 110 is driven by battery and carried by an operator. The terminal 110 accommodates a memory card to back up (hold) data and store a program that may be amended or replaced. The terminal 110 has a communication function to send and receive data to and from a host device such as a personal computer or an office server. The display 112 may be a liquid crystal display that may serve as a touch panel to enable an operator to enter data by touching the display 112 with a finger. The operation keys 113 include function keys and numeric keys.

In FIG. 2, the terminal 120 comprises a display 121, operation keys 122, and a connector 123 to be connected to an external device such as a pen scanner or a bar code reader. The terminal 120 is driven by battery and is carried by an operator. The terminal 120 accommodates a memory card to back up data and store a program that may be amended or replaced. The terminal 120 has a communication function to send and receive data to and from a host device such as a personal computer or an office server. The display 121 may be a liquid crystal display larger than the display 112 of the terminal 110, to display various information such as graphs, tables, and input guidance. The display 121 may serve as a touch panel that enables an operator to enter data by touching the display 121 with a finger or a pen. The operation keys 122 include function keys and numeric keys. Like a notebook-type personal computer, the terminal 120 may be connected to a peripheral device such as a printer.

Figure 3:
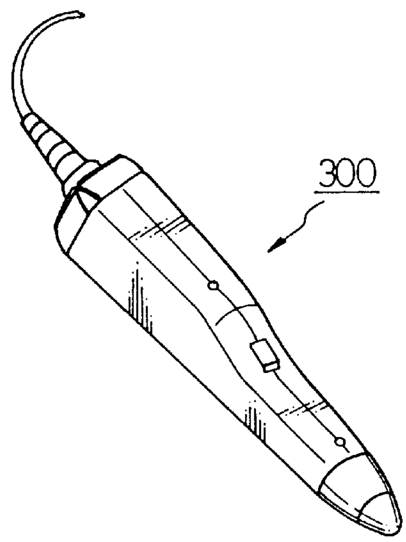
FIG. 3 is a perspective view showing a pen scanner connected to a data processing terminal.
Figure 4:
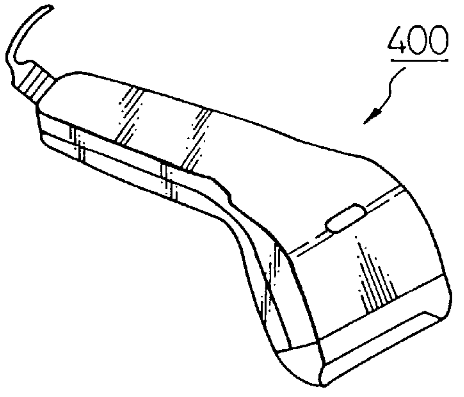
FIG. 4 is a perspective view showing a touch scanner connected to a data processing terminal.
Figure 5:
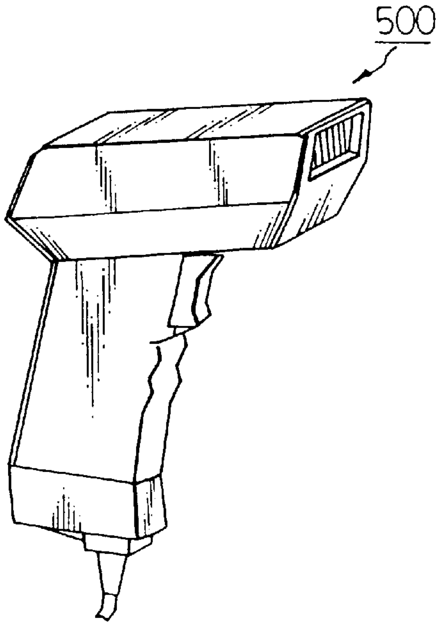
FIG. 5 is a perspective view showing a laser scanner connected to a data processing terminal.

FIG. 3 shows a pen scanner 300, FIG. 4 shows a touch scanner 400, and FIG. 5 shows a laser scanner 500. Any one of these scanners can serve as an external device, connected to the terminal 110 or 120, to read bar codes on commodities.

The pen scanner 300 of FIG. 3 is grasped like a pen, and the tip thereof is placed on a white side margin of a bar code and is moved to the other side thereof, to read the bar code.

The touch scanner 400 of FIG. 4 has a read window that is placed on a bar code, to read it at once. The scanners 300 and 400 each employ a red LED as a light source.

The laser scanner 500 of FIG. 5 has a read window for emitting a laser beam and an oscillation mirror to scan and read a bar code with the laser beam. The laser scanner 500 is capable of reading a bar code at a distance from the scanner.

Standard hand-held data processing terminals employ a bar image interface that transmits electric signals based on white and black bars of a bar code read by a bar code reader. The terminals must decode the electric signals into letters (alphabets), numerals, and symbols. This puts heavy loads on the terminals, complicates the terminals, and makes the terminals heavier. In addition, an optional device such as a communication adapter for the terminals must also have a decoding function when the optional device is connected to the bar code reader.

Accordingly, it is advantageous that the bar code reader, instead of the terminals, has the decoding function. To realize this, a serial interface that transfers ASCII codes from a bar code reader is adopted.

The bar image interface mentioned before sends electric signals based on white and black bars of a bar code, and therefore, the terminals must decode the electric signals, to determine whether or not the bar code data are necessary and to test the number of digits and modulus of the data. The terminals are not required to specify read conditions for the bar code reader. The bar image interface may employ an additional one or two signal lines between the terminal and the bar code reader to light an LED or sound a buzzer for read recognition by inverting the polarities of the signal lines in accordance with the decoded results.

On the other hand, the bar code reader employing the serial interface must not only have a decoding function but also a function of specifying the type of bar codes to be read and a checking method. These functions are changed from one to another by sending ASCII control commands from the terminal to the bar code reader. The LED and buzzer of the bar code reader are also controllable by control commands.

Control command systems for bar code readers including pen scanners, touch scanners, and laser scanners differ from one another depending on their types.

If a control command system in a given hand-held data processing terminal is entirely different from that of a bar code reader connected to the terminal, the bar code reader may not work. Moreover, if the command system registered in the terminal is wrongly connected to the bar code reader, the bar code reader may be damaged.

This trouble will not happen if all bar code readers employ the same command system. This, however, is not practical because it costs a large amount of money to remodel bar code readers. It is more economical to use off-the-shelf bar code readers.

Note that the same command has different meanings by each type of the bar code readers (pen scanner, touch scanner, or laser scanner), or one command has differently used in each type of the bar code readers.

Next, preferred embodiments of the present invention will be explained with reference to the accompanying drawings.

Figure 6:
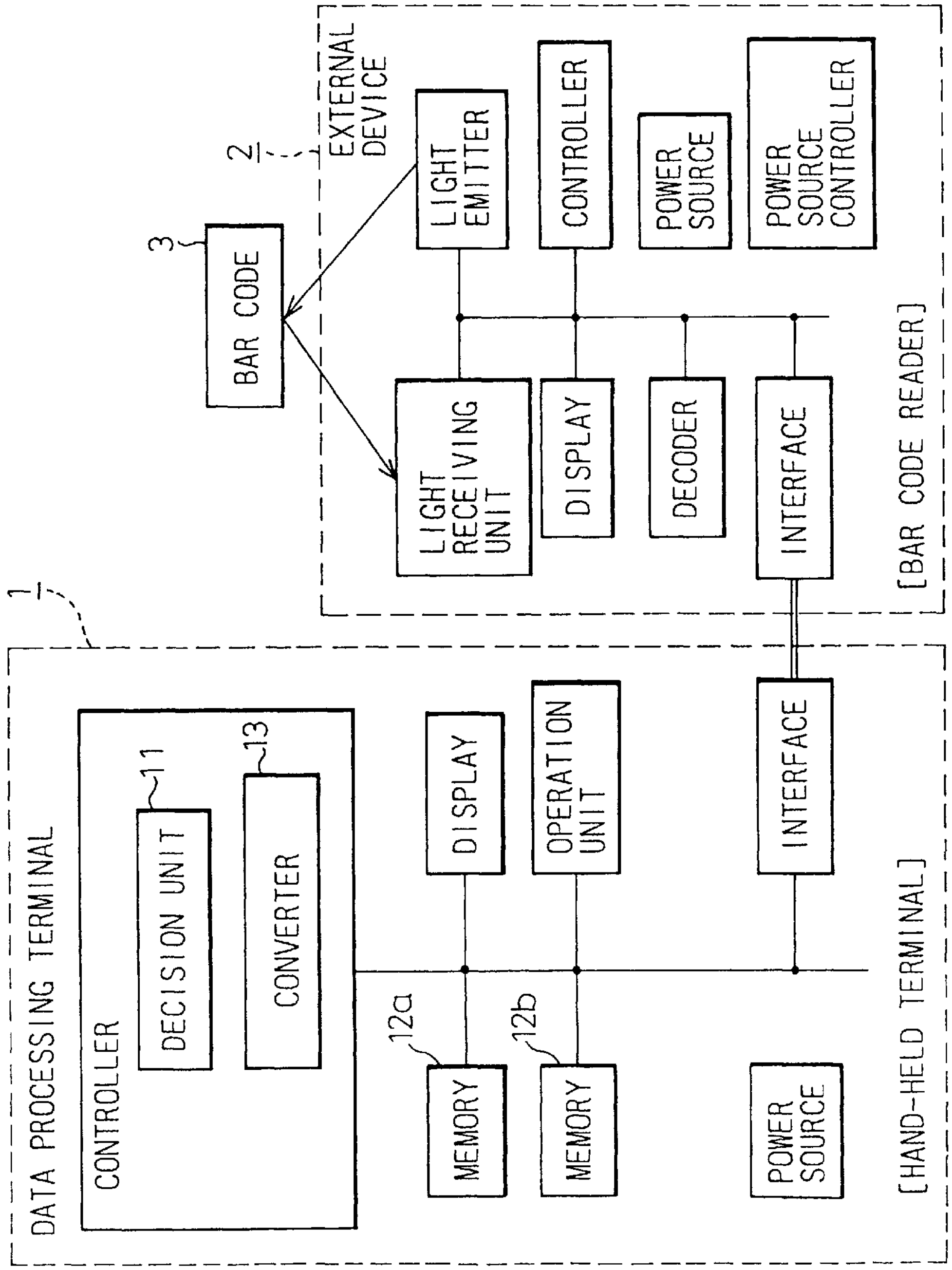
FIG. 6 is a block diagram showing a hand-held data processing terminal and a bar code reader, according to an embodiment of the present invention.

FIG. 6 is a block diagram showing a hand-held data processing terminal 1, an external device, i.e., a bar code reader 2, and a bar code 3, according to an embodiment of the present invention.

The terminal 1 is connected to the bar code reader 2 through signal lines. One of the signal lines is used to transmit a control command from the terminal 1 to the bar code reader 2. The terminal 1 has a decision unit 11. The bar code reader 2 returns a response (in response to the control command) to the terminal 1 upon receiving a control command from the terminal 1. The decision unit 11 determines the type of the bar code reader 2 according to the response from the bar code reader 2. Namely, the decision unit 11 determines, according to the response, whether the bar code reader 2 connected to the terminal 1 is a first bar code reader 2*a* or a second bar code reader 2*b*.

The terminal 1 has memories 12*a* and 12*b* and a command converter 13. The memory 12*a* stores a result of the decision made by the decision unit 11. The memory 12*b* stores a conversion table used by the command converter 13. The command converter 13 converts a control command in one format into one in another format according to the contents of the memories 12*a* and 12*b*. Note that, the memory 12*a* is a volatile memory, e.g., a DRAM, and the memory 12*b* is a nonvolatile memory, e.g., PROM or SRAM (which can be regard as a nonvolatile memory by being supplied with a battery power).

If the first bar code reader 2*a* is connected to the terminal 1, the command converter 13 converts a command into one that is proper for the first bar code reader 2*a*. If the second bar code reader 2*b* is connected to the terminal 1, the command converter 13 converts a command into one that is proper for the second bar code reader 2*b*. These operations are automatically carried out. The details of the conversion will be explained later with reference to FIG. 13.

Figure 7:
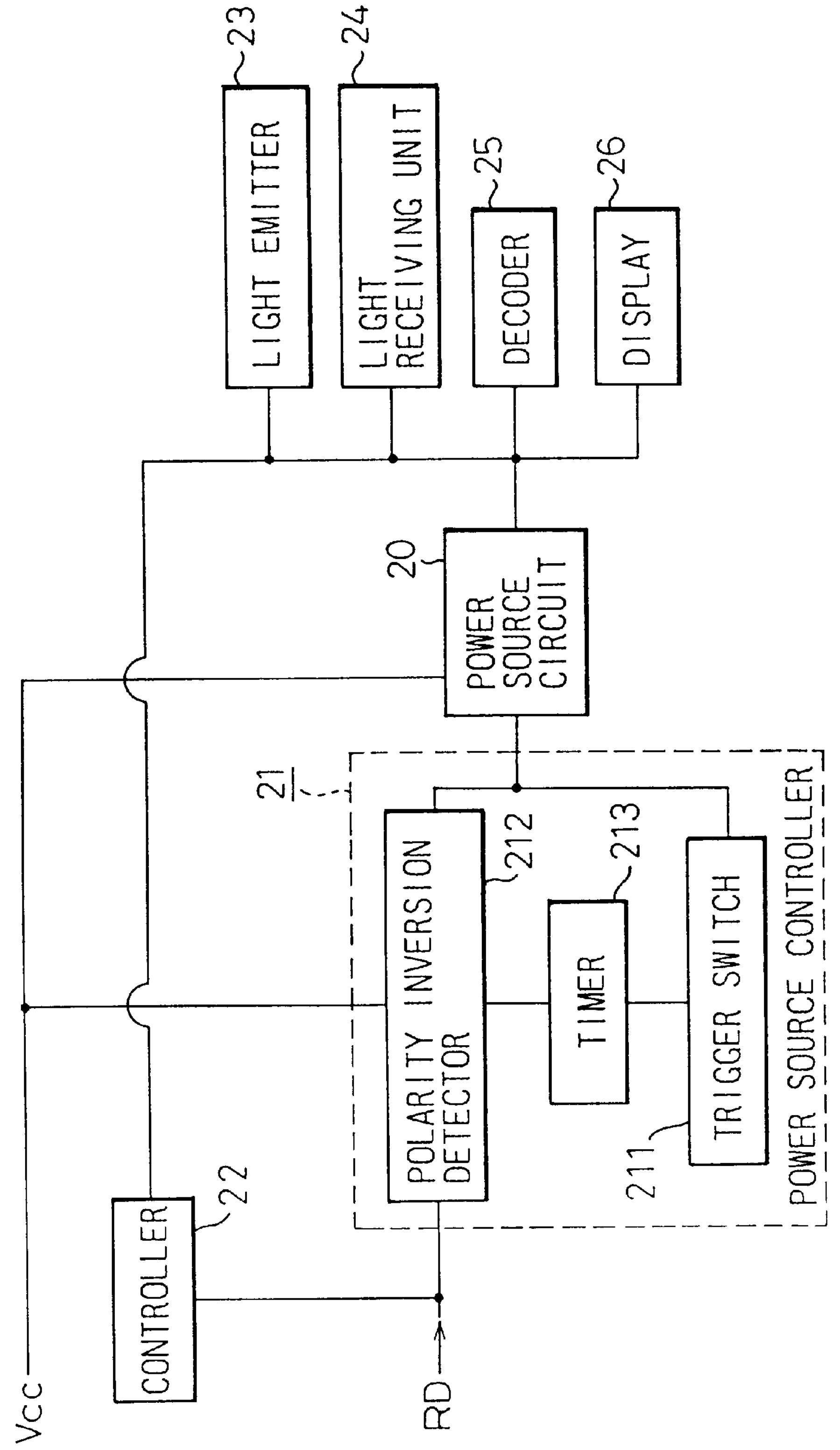
FIG. 7 is a block diagram showing the bar code reader of FIG. 6.

FIG. 7 is a block diagram showing the bar code reader 2 of FIG. 6. The bar code reader 2 is designed to reduce the power consumption of the terminal (hand-held data processing terminal) 1.

As shown in FIG. 7, the bar code reader (external device) 2, which is connected to a data processing terminal (hand-held data processing terminal) 1, comprises a power source circuit (power source means) 20, elements 23, 24, 25, 26, the power source controller (power supply control means) 21, and a controller (CPU) 22.

The power source circuit 20 is used to supply power to the elements 23, 24, 25, 26 and the controller 22. The power supply controller 21 is used to stop the supply of power from the power source circuit 20 to the elements 23, 24, 25, 26, if another control command from the terminal 1 is not received within a predetermined time. Note that, the predetermined time is counted by a timer 213.

The elements include a light emitter 23, a light receiving unit 24, a decoder 25, and a display 26. The light emitter 23 is used to emit light onto a bar code, and the light receiving unit 24 is used to receive reflected light from the bar code. Further, the decoder 25 is used to decode output signals of the light receiving unit into, for example, ASCII codes, in response to the reflected light, or output signals of the light receiving unit 24. The display 26 indicates, for example, the decoded ASCII codes or various information.

The bar code reader 2 has a power source controller 21 which includes a trigger switch 211, a polarity inversion detector 212, and the timer 213.

The trigger switch 211 is, for example, arranged on a front panel of the bar code reader 2, so that it is easy to push. The polarity inversion detector 212 is connected to a data line RD of the terminal 1. The power source controller 21 usually sets the bar code reader 2 to a power saving state, to supply power only to the polarity inversion detector 212.

When the trigger switch 211 is pushed to start reading a bar code, power is supplied to the other elements. Namely, the trigger switch 211 is used to activate a power source circuit 20 and supply power to the elements 23, 24, 25, 26 in order to start reading a bar code, when the trigger switch is pushed during a power saving state.

The polarity inversion detector 212 detects the polarity of the proper command and supplies or does not supply power to the elements 23, 24, 25, 26. Namely, the polarity inversion detector 212 is used to activate a power source circuit 20 and supply power to the elements 23, 24, 25, 26 in order to start reading a bar code, when the trigger switch is pushed during a power saving state.

Note that, output signals of the trigger switch 211 and polarity inversion detector 212 are supplied to the timer 213, and the timer 213 starts to count a predetermined time.

The terminal 1 may send a proper command to the polarity inversion detector 212, to let the power source controller 21 activate a power source circuit 20 to supply power to the elements. The bar code reader 2 resumes the power saving state a predetermined time after a bar code is read.

The decision unit 11 of FIG. 6 determines the type of the bar code reader 2 connected to the terminal 1, and the memory (for example, DRAM) 12*a* stores the result.

The decision unit (external device determining means) 11 is used to determine a type of the bar code reader (external device) 2 according to the response returned by the bar code reader 2 in response to the control command, which will be explained with reference to FIG. 11. The memory (determination result storing means) 12*a* is used to store a result of determination made by the decision unit 11.

The converter (control command converting means) 13 is used to convert the control command in one format into one in a proper format for the bar code reader 2 according to a result of determination made by the decision unit 11 and to send the converted control command to the bar code reader 2. Namely, the command converter 13 converts a control command in one format into one in another format according to the conversion table stored in the memory (for example, PROM or SRAM) 12*b*, and the converted command is sent to the bar code reader 2. Note that, the command converter (control command converting means) 13 carries out a command conversion for the control command according to a conversion table (with reference to FIG. 13). Further, the memory 12*b* can be constituted by a part of a memory unit (PROM or SRAM) used for storing programs for the terminal 1.

Accordingly, the terminal 1 is capable of handling, according to a single command system, different external devices, i.e., bar code readers including pen scanners, touch scanners, and laser scanners operating on different control command systems.

The terminal 1 activates the bar code reader 2 only when actually reading a bar code, to thereby reduce the power consumption.

To read a bar code, the trigger switch 211 may be pushed, or the terminal 1 may send a wake-up command to the polarity inversion detector 212.

After a predetermined time, the bar code reader 2 resumes the power saving state, to thereby reduce power consumption.

FIG. 8 is a table of commands for a pen scanner, and FIG. 9 is a table of commands for a touch scanner.

The pen scanner commands of FIG. 8 are one-byte character commands. When receiving a defined or undefined command, the pen scanner notifies the terminal 1 of the reception of the command by turning OFF a transmission control signal CS as shown in FIG. 10A.

The touch scanner commands of FIG. 9 are one-or several-byte character commands each having CR at the end.

When the touch scanner normally receives a command from the terminal 1, it returns an acknowledge signal ACK to the terminal 1, and if it receives an undefined command or fails to receive a command, it returns a negative acknowledge signal NAK to the terminal 1.

The terminal 1 and bar code reader 2 according to the present invention may handle several bar code systems such as JAN (Japan Article Number), EAN (European Article Number), UPC (Universal Product Code of U.S.A.), CODE 39, NW-7, STF, ITF, CODE 11, CODE 93, and CODE 128.

To instruct the touch scanner to read JAN/EAN/UPC, the terminal 1 sends a command "S+,+A+CR."

If this command is sent by mistake when the pen scanner, instead of the touch scanner, is connected to the terminal 1, the command will trigger unexpected actions of the pen scanner. Namely, "S" in the command tests a check digit, "," limits the number of digits to read to 28, and "A" enables the reading of CODE 39.

On the contrary, if a command "S" for testing a check digit for the pen scanner is sent by mistake when the touch scanner is connected to the terminal 1, the touch scanner will do nothing and wait for "CR" that indicates the end of each command in the touch scanner command system.

Accordingly, it is necessary to know the type of the bar code reader 2 connected to the terminal 1 before sending a command from the terminal 1 to the bar code reader 2.

FIG. 10A shows waveforms explaining a response from the pen scanner of FIG. 8 in response to a command. Figure 10B shows waveforms explaining a response from the touch scanner of FIG. 9 in response to a command. In these figures, SD represents transmitted data, and RD represents received data.

As shown in Fig. 10A, when the terminal 1 sends a command (SD), the pen scanner replies to it by turning OFF the signal CS. On the other hand, as shown in FIG. 10B, when the terminal 1 sends a command (SD), the touch scanner replies an acknowledge signal ACK or a negative acknowledge signal NAK to the terminal 1. Therefore, the terminal 1 can confirm or recognize the type of the bar code reader (pen scanner or hand scanner) by the different response from the different bar code reader.

Figure 11:
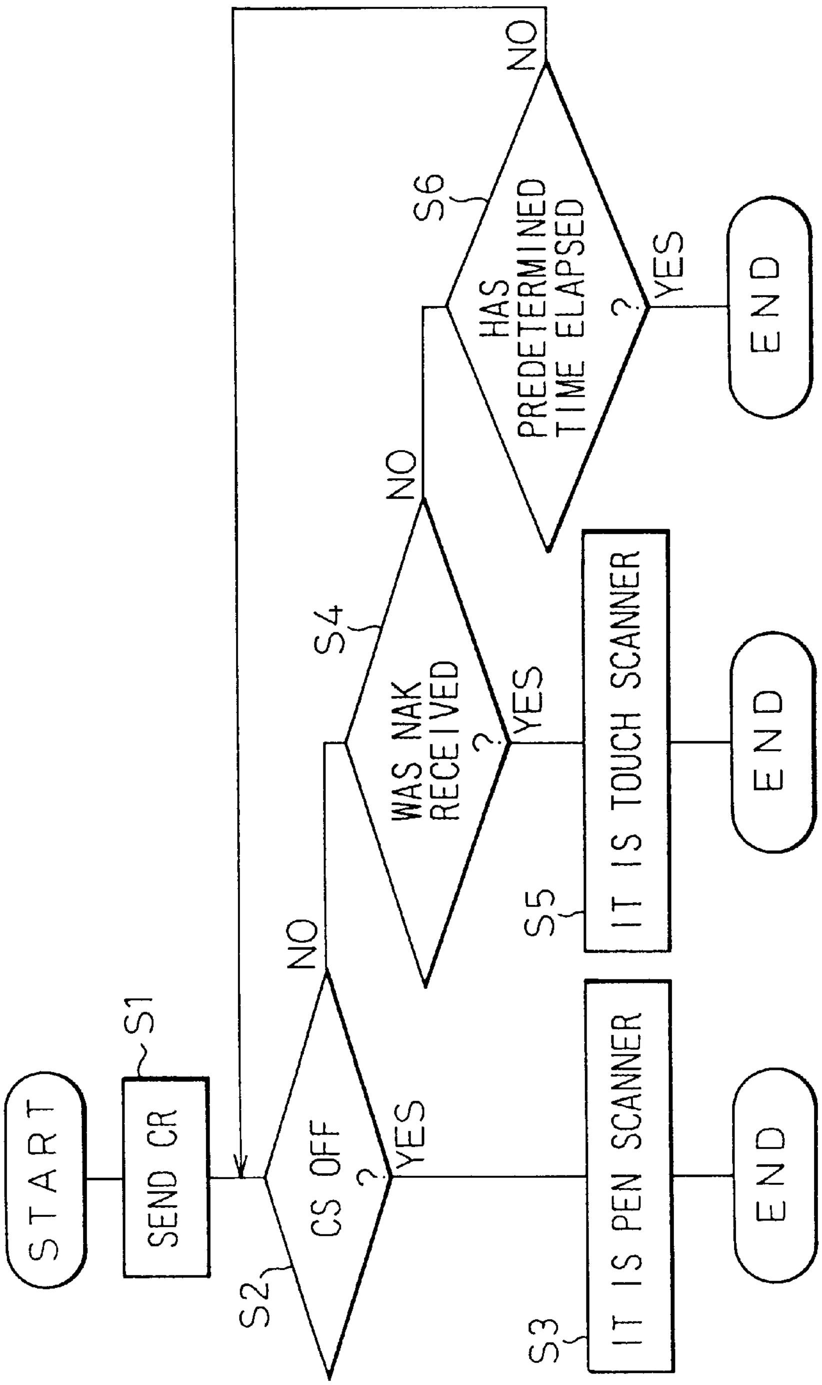
FIG. 11 is a flowchart showing the steps of determining the type of an external device, according to the present invention.

FIG. 11 is a flowchart showing the steps of determining the type of an external device connected to the terminal 1, according to the present invention.

When a bar code reader is connected to the terminal 1, the terminal sends a command character CR in step S1 before sending any command.

The character CR corresponds to an undefined command both for the pen scanner and touch scanner, so that the character CR never causes the pen scanner or touch scanner malfunction. In response to the character CR, the pen scanner turns OFF the signal CS, and the touch scanner returns a negative acknowledge signal NAK.

The terminal 1 monitors the reply and determines whether the bar code reader 2 is a pen scanner or a touch scanner.

In Step S2, the terminal 1 determines whether or not the signal CS is OFF. If it is OFF, step S3 determines that the bar code reader 2 connected to the terminal 1 is the pen scanner.

If the signal CS is not OFF, step S4 determines whether or not a negative acknowledge signal NAK has been detected. If it has been detected, step S5 determines that the bar code reader 2 is the touch scanner.

If the signal NAK has not been detected, step S6 determines whether or not a predetermined time (which is, for example, a time counted from when the command character CR is sent from the terminal) has elapsed. Until the predetermined time has elapsed, the steps following the step S2 are repeated, and when the predetermined time has elapsed, the flow ends.

If no reply is received, the character CR may be sent again, or the bar code reader 2 connected to the terminal 1 may be replaced with another. The determined type of the bar code reader 2 is stored in the memory (DRAM) 12*a* of FIG. 6.

Note that the determined type of the bar code reader 2 stored in the memory 12*a* is, for example, used to convert the control command in one format into one in a proper format for the determined type of the bar code reader in the terminal, and to send the converted control command from the terminal to the bar code reader.

According to the determined type of the bar code reader 2, the terminal 1 converts a command into a proper one. This will be explained with reference to FIG. 12.

Figure 12:
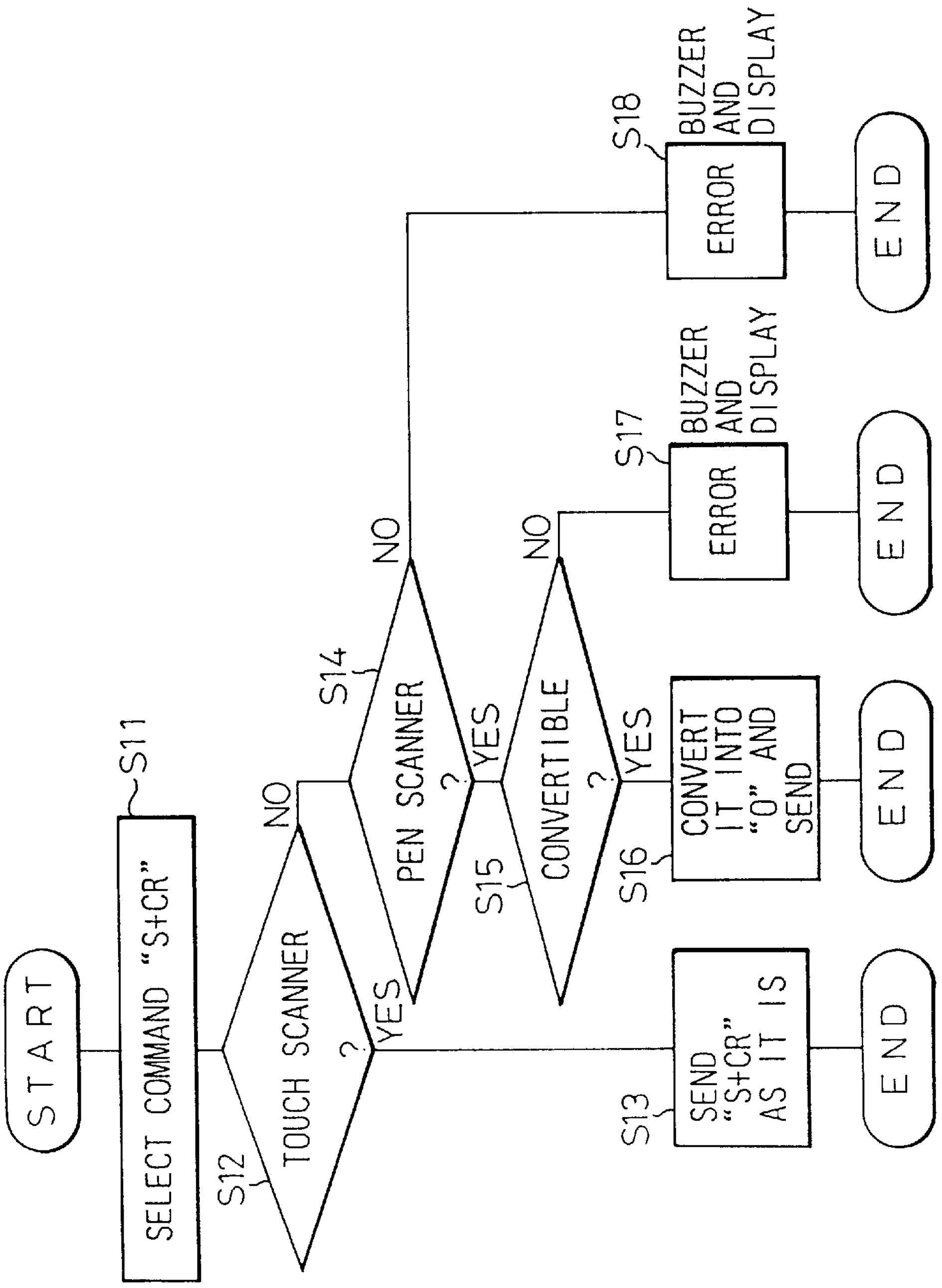
FIG. 12 is a flowchart showing the steps of converting a command according to a connected external device, according to the present invention.

FIG. 12 is a flowchart showing the steps of converting a command into a proper one for an external device connected to the terminal 1, according to the present invention.

In this example, a program stored in the terminal 1 is prepared according to the touch scanner command system.

Note that the program stored in the terminal 1 is directly sent (touch scanner: S12) or converted and sent (pen scanner: S14, S15), in accordance with the determined type of the bar code reader (which is stored in the memory 12*a*). Namely, if a pen scanner is connected to the terminal 1, the terminal 1 must convert every command in the touch scanner command system into one in the pen scanner command system.

Step S11 selects, as an example, a command "S+CR" to set the touch scanner to a default (initial) state and stores it in the volatile memory 12*a* of FIG. 6.

Step S12 determines whether or not the external device connected to the terminal 1 is a touch scanner according to the data stored in the memory 12*a*.

If the external device is the touch scanner, step S13 sends the command "S+CR" as it is to the touch scanner.

If the step S12 determines that the external device is not the touch scanner, step S14 determines if it is a pen scanner.

If it is the pen scanner, step S15 determines whether or not the command "S+CR" is convertible into one for the pen scanner.

Since the command "S+CR" for the touch scanner corresponds to a command "O" for the pen scanner, step S16 converts it into the pen scanner command "O" and sends it to the pen scanner.

FIG. 13 is a table of command conversions for different external devices, according to the present invention.

The command conversion is carried out according to a conversion table of FIG. 13 stored in the nonvolatile memory (PROM or SRAM) 12*b* of FIG. 6.

A touch scanner command of, for example, "L+N+CR" has no corresponding pen scanner command. In this case, step S17 of FIG. 12 determines that the command is not convertible and carries out an error process.

For example, the error process may light a red alarm lamp and sound a buzzer to indicate the failed conversion in the bar code reader 2.

If the step S14 determines that the external device connected to the terminal 1 is not the touch scanner nor the pen scanner, step S18 carries out the error process.

The program stored in the terminal 1 may be prepared according to the pen scanner command system, which is handled in the similar manner as explained above.

FIG. 14 is a table of commands for a laser scanner. The laser scanner is enabled to receive a command in response to a predetermined character. Namely, the laser scanner is set to a standby state from a sleep state upon receiving the predetermined character. For the convenience of explanation, the command system of FIG. 14 is the same as that for the touch scanner.

The character to set the laser scanner to the standby state from the sleep state is called a wake-up command. Usually, the laser scanner is designed to return an acknowledge signal ACK in response to the wake-up command. Instead, it may return no response.

If the wake-up command for the laser scanner is"CR," it is an undefined command for the pen scanner or touch scanner. Accordingly, in response to the wake-up command "CR," the pen scanner turns OFF the signal CR, the touch scanner returns a negative acknowledge signal NAK, and the laser scanner returns an acknowledge signal ACK. It is possible, therefore, to surely identify a pen scanner, a touch scanner, or a laser scanner.

If there is no proper character to determine the type of a bar code reader connected to the terminal 1, at least one signal line may be added between the terminal 1 and the bar code reader, and a polarity decision unit of the terminal 1 determines the polarity of the signal line, to determine the type of the barcode reader. By adding n signal lines, it is possible to identify $2^n$ bar code readers.

Returning to FIG. 7, an arrangement for reducing the power consumption of the bar code reader 2 will be explained.

A signal on a signal line RD from the terminal 1 (FIG. 6) is received by the controller 22 and the polarity inversion detector 212 of the power source controller 21 of the bar code reader 2. The polarity inversion detector 212 detects an inversion, i.e., a rise or a fall in the signal.

The polarity inversion detector 212 may have any configuration if it can detect an inversion in the polarity of a signal.

When the polarity inversion detector 212 detects an inversion in the polarity of the signal on the signal line RD, it sets the power source circuit 20 to the standby state. If the trigger switch 211 is pushed, the power source circuit 20 supplies power to the controller 22 and other elements.

After.receiving power, the controller 22 recognizes a command signal as a control command and carries out an operation corresponding to the command.

Figures 15A, 15B, 15C, 15D, 15E, 15F, 15G:
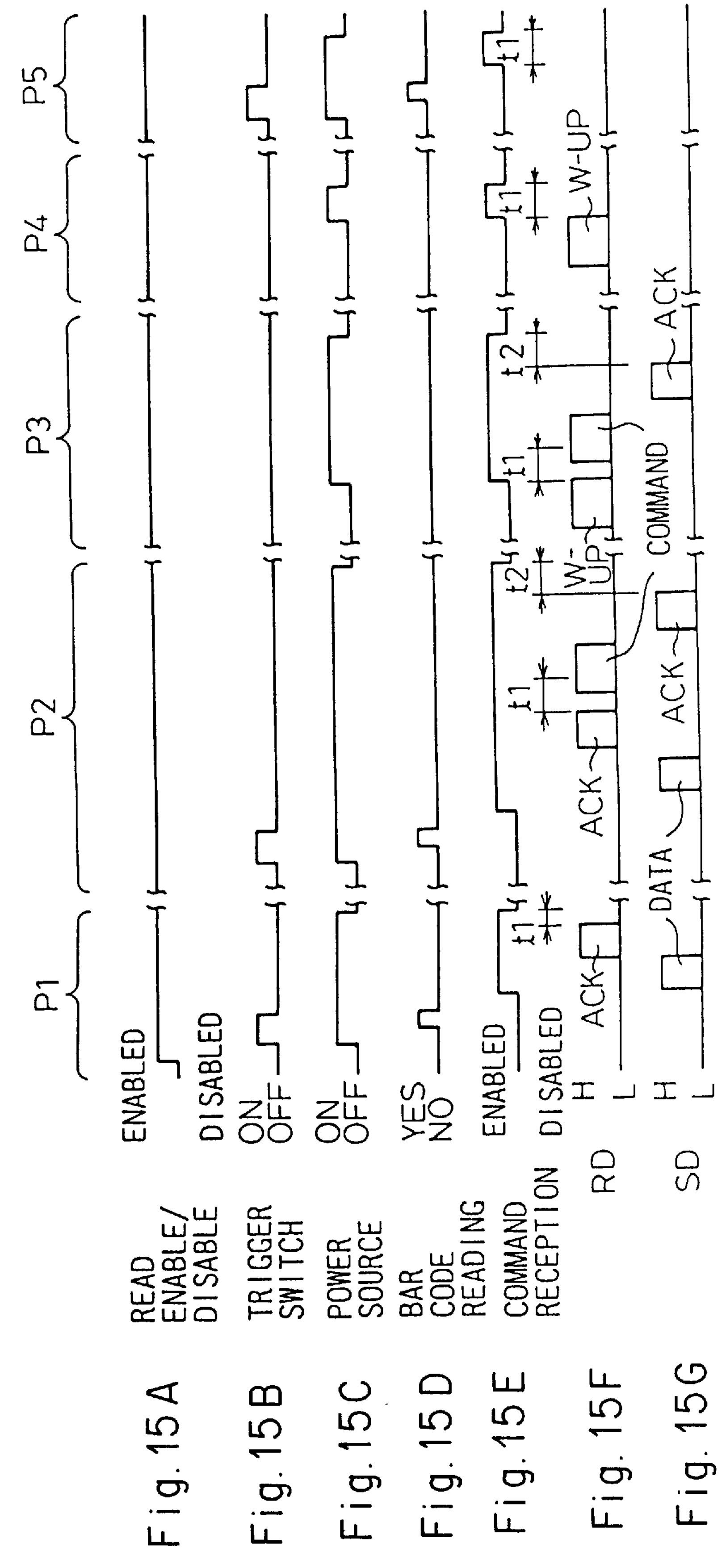
FIG. 15 is a timing chart explaining the operation of the bar code reader of FIG. 7.

FIG. 15 is a timing chart explaining the operation of the bar code reader 2 of FIG. 7. A reference mark P1 is an operation of reading a bar code executed when the trigger switch 211 is pushed.

When the terminal 1 is energized, a read enable/disable signal rises. If the trigger switch 211 is pushed under a read enabled state, the power source of the bar code reader 2 supplies power to the respective elements, to read a bar code.

The read bar code data are decoded and transmitted on a signal line SD to the terminal 1, which returns an acknowledge signal ACK to the bar code reader 2 through the signal line RD after correctly receiving the data.

Just after sending the data to the terminal 1, the bar code reader 2 becomes ready to receive a command from the terminal 1.

If load on the controller of the bar code reader 2 during the bar code read operation is heavy, the bar code reader 2 may be ready to receive a control command including the signal ACK from the terminal 1 after completely reading the data. In this case, the bar code reader 2 is ready to receive a command within a time t1 after the reception of the signal ACK.

When the time t1 elapses after receiving the response from the terminal 1, the power source of the bar code reader 2 is turned OFF to accept no command from the terminal 1.

A reference mark P2 of FIG. 15 shows the operations of the bar code reader 2 of reading a bar code started by pressing the trigger switch 211 and receiving a control command to display a read confirmation message and sound a buzzer. The bar code reading operation is the same as P1, and therefore, only the control command receiving operation will be explained.

The terminal 1 sends the control command within the time t1 that starts when the terminal 1 outputs an acknowledge signal ACK to the bar code reader 2. As soon as it receives the control command, the bar code reader 2 returns an acknowledge signal ACK to the terminal 1 through the signal line SD and carries out the operation corresponding to the control command.

When a time t2 elapses after sending the acknowledge signal ACK to the terminal 1, the bar code reader 2 is automatically turned OFF to save power.

Accordingly, if the terminal 1 intends to consecutively send another control command to the bar code reader 2, it must send it within the time t2 after receiving the acknowledge signal ACK from the bar code reader 2.

The time t2 is dependent on a time needed by the bar coder reader 2 to carry out an operation corresponding to a control command provided by the terminal 1.

In FIG. 15, a reference mark P3 is an operation of the bar code reader 2 of continuously receiving a wake-up command W-UP and another control command from the terminal 1.

The wake-up command turns ON the power source of the bar code reader 2, to supply power to the controller and other elements of the bar code reader 2. Thereafter, the bar code reader 2 is ready to receive a control command from the terminal 1 until the time t1 elapses.

If the terminal 1 sends a control command within the time t1, the bar code reader 2 returns an acknowledge signal ACK through the signal line SD if the bar code reader 2 normally receives the control command, and carries out an operation corresponding to the control command.

After sending the signal ACK, the bar code reader 2 is automatically turned OFF if no control command is received within the time t2, to save power.

Accordingly, the terminal 1 must send the next control command within the time t2 after receiving the signal ACK.

In FIG. 15, a reference mark P4 is an operation of the bar code reader 2 after receiving only a wake-up command W-UP and receiving no control command thereafter. If the bar code reader 2 receives no control command within the time t1 after the wake-up command W-UP, the power source of the bar code reader 2 is automatically turned OFF.

In FIG. 15, a reference mark P5 is an operation of the bar code reader 2 after not reading a bar code and receiving no control command after the trigger switch 211 is pushed.

If nothing is done within the time t1 after the bar code reader 2 becomes ready to receive a control command, the bar code reader 2 is automatically turned OFF to save power.

Figure 16:
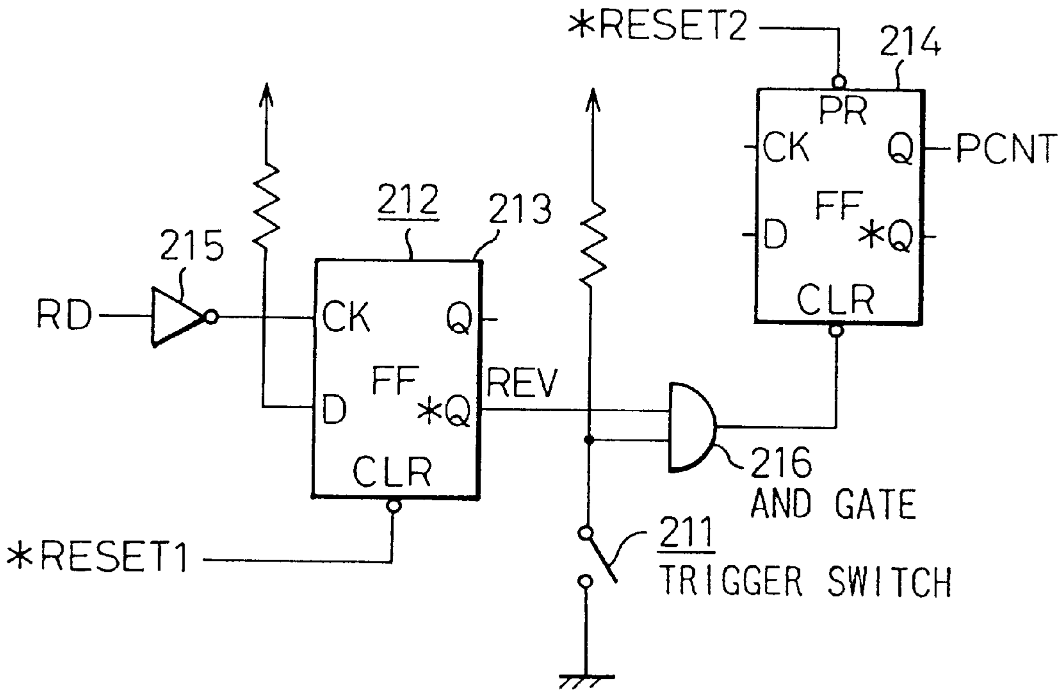
FIG. 16 is a circuit diagram showing a power source circuit and a power source controller of the bar code reader of FIG. 7.

FIG. 16 is a circuit diagram showing the power source circuit 20 and power source controller 21 of the bar code reader 2 of FIG. 7. The circuits 20 and 21 consist of flip-flop circuits 213 and 214, an inverter 215, and an AND gate 216.

The inverter 215 inverts an optional character, for example, NULL on the signal line RD and supplies the inverted signal to the clock input CK of the flip-flop circuit 213.

As a result, the output *Q of the flip-flop 213 changes from 1 to 0 at a rise of the signal on the signal line RD. The output *Q corresponds to a polarity inversion detection output REV.

At this time, the output of the AND gate 216 changes from 1 to 0. Accordingly, the output Q of the flip-flop circuit 214, i.e., the output PCNT of the power source circuit 20 changes from 0 to 1, to start supplying power to the respective elements.

When the trigger switch 211 is pushed, the output of the AND gate 216 changes from 1 to 0, so that the output Q of the flip-flop circuit 214, i.e., the output PCNT of the power source circuit 20 changes from 0 to 1, to start supplying power to the elements.

Reset signals *REST1 and *REST2 are generated a predetermined time after the polarities of the outputs REV and PCNT of the flip-flop circuits 213 and 214 are inverted, to clear these flip-flop circuits and initialize the polarities of the outputs REV and PCNT. Note that the reset signals *REST1 and *REST2 may be output from the timer 213 shown in FIG. 7.

Figures 17A, 17B, 17C:
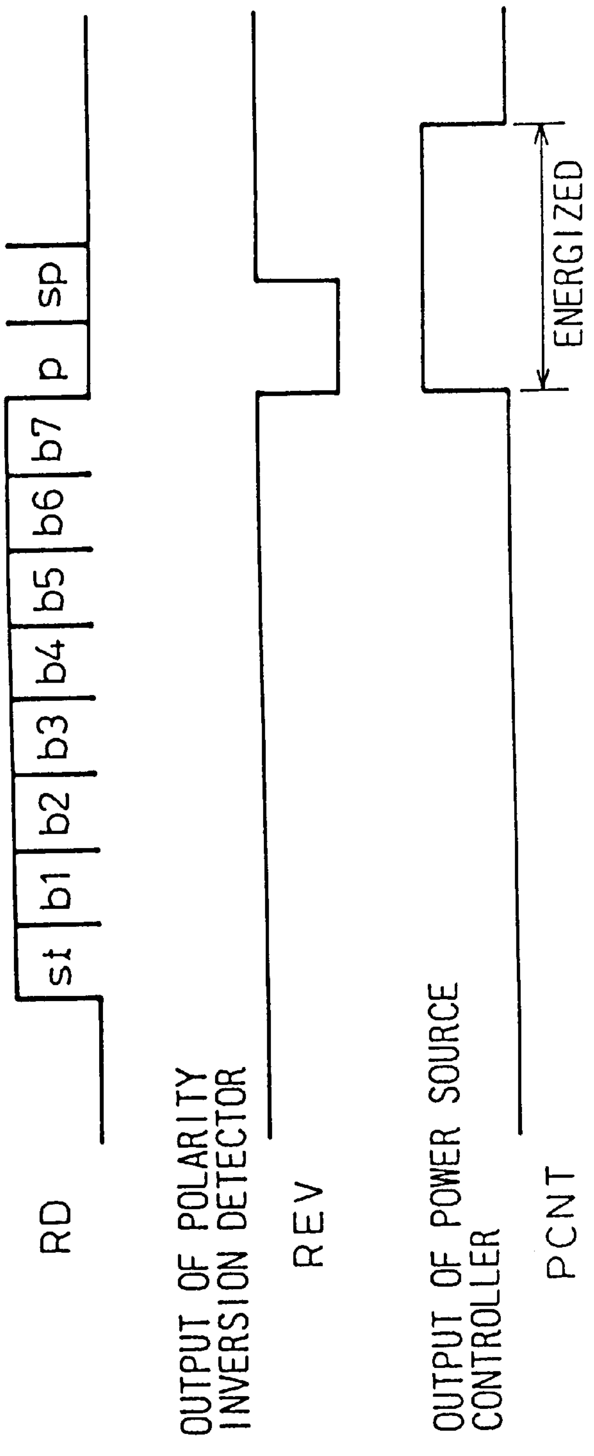
FIG. 17 is a timing chart showing signals in the circuits of FIG. 16.

FIG. 17 is a timing chart showing the statuses of signals in the circuits of FIG. 16. A signal in the signal line RD consists of a start bit st, seven data bits, a parity bit p, and a stop bit sp.

When the polarity inversion detection output REV falls, the power control output PCNT rises to energize the respective elements.

Figure 18:
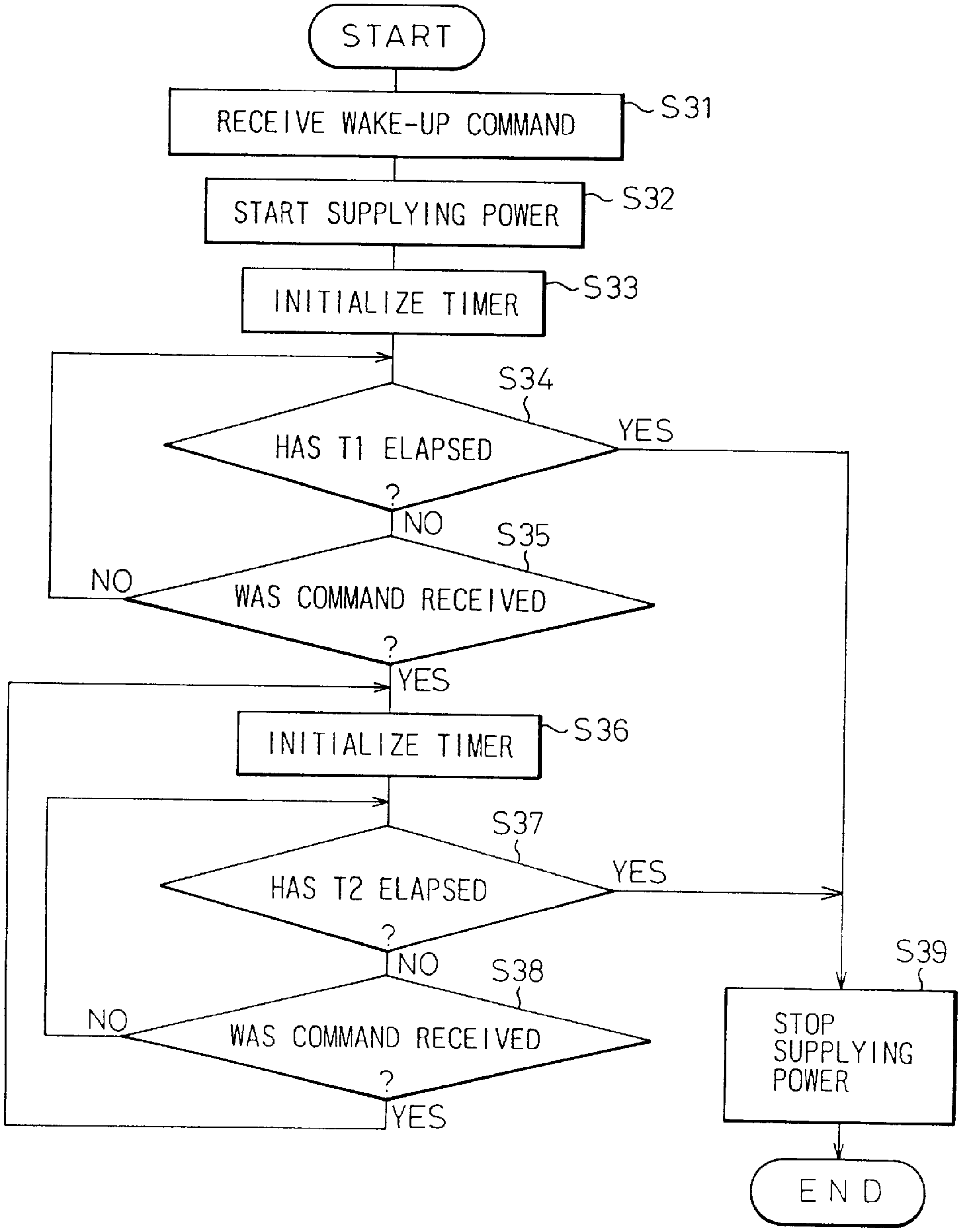
FIG. 18 is a flowchart explaining the operation of the circuits of FIG. 16.

FIG. 18 is a flowchart explaining the operations of the circuits of FIG. 16.

Step S31 receives a wake-up command.

Step S32 starts supplying power, and step S33 initializes a timer.

Step S34 determines whether or not a time T1 has elapsed. If not, step S35 determines whether or not a command has been received. If no command has been received, the step S34 is repeated.

If the step S35 determines that a command has been received, step S36 initializes the timer.

Step S37 determines whether or not a time T2 has elapsed. If not, step S38 determines whether or not a command has been received. If no command has been received, the step S37 is repeated. If a command has been received, the steps following the step S36 are repeated.

If the step S34 determines that the time T1 has elapsed, or if the step S37 determines that the time T2 has elapsed, step S39 stops the supply of power, and the flow ends.

As explained above, the present invention determines the type of a bar code reader connected to a hand-held data processing terminal and carries out processes accordingly. The present invention converts a command in a predetermined format stored in the terminal into a command in a format proper for the bar code reader connected to the terminal and sends it to the bar code reader.

Accordingly, the present invention never mistakenly sends a wrong command to the bar code reader to cause the same to malfunction and is capable of controlling several types of bar code readers having different control command systems with a single program without changing the program depending on the types of the bar code readers.

The present invention sends an optional character to start supplying power to the bar code reader, to enable the bar code reader to receive a control command without pushing a trigger switch of the bar code reader.

When the bar code reader is not in use, the power supply to the bar code reader is automatically stopped to save power and extend the operable hours of the terminal.

Many different embodiments of the present invention may be constructed without departing from the spirit and scope of the present invention, and it should be understood that the present invention is not limited to the specific embodiments described in this specification, except as defined in the appended claims.

What is claimed is:

1. A data processing terminal that sends control commands to an external device connected thereto, to control said external device, wherein said data processing terminal comprises:

control command sending means for sending a control command to said external device for controlling said external device, the control command not being used to indicate a specific operation of said external device:

external device determining means for determining a type of said external device. according to a response returned by said external device in response to said control command; and control command converting means for converting said control command in one format into one in a proper format for said external device according to a result of the determination made by said external device determining means and for sending the converted control command to said external device.

2. A data processing terminal as claimed in claim 1, wherein said data processing terminal further comprises determination result storing means for storing a result of determination made by said external device determining means.

3. A data processing terminal as claimed in claim 2, wherein said determination result storing means is a volatile memory.

4. A data processing terminal as claimed in claim 1, wherein said control command converting means carries out a command conversion for said control command according to a conversion table.

5. A data processing terminal as claimed in claim 4, wherein said conversion table is stored in a semiconductor memory.

6. A data processing terminal as claimed in claim 5, wherein said semiconductor memory is a nonvolatile memory.

7. A data processing terminal as claimed in claim 1, wherein said data processing terminal is a hand-held data processing terminal, and said external device is a bar code reader.

8. A data processing terminal as claimed in claim 7, wherein said control command sent by said control command sending means is a command not influencing to a reading operation of said bar code reader.

9. A hand-held data processing terminal that sends control commands to a bar code reader connected thereto, to control said bar code reader, wherein said hand-held data processing terminal comprises:

control command sending means for sending a control command to said bar code reader for controlling said bar code reader;

bar code reader determining means for determining a type of said bar code reader according to a response returned by said bar code reader in response to said control command; and control command converting means for converting said control command in one format into one in a proper format for said bar code reader according to a result of the determination made by said bar code reader determining means and for sending the converted control command to said bar code reader.

* * * * *